J. C. POTTER.
GEARING FOR TURRET LATHES AND OTHER MECHANISM.
APPLICATION FILED APR. 3, 1913.

1,225,487.

Patented May 8, 1917.
6 SHEETS—SHEET 2.

J. C. POTTER.
GEARING FOR TURRET LATHES AND OTHER MECHANISM.
APPLICATION FILED APR. 3, 1913.

1,225,487.

Patented May 8, 1917.

WITNESSES
George L. Barnes
A. P. Hayes

INVENTOR
James C. Potter,
by Chas. J. Williamson
Attorney

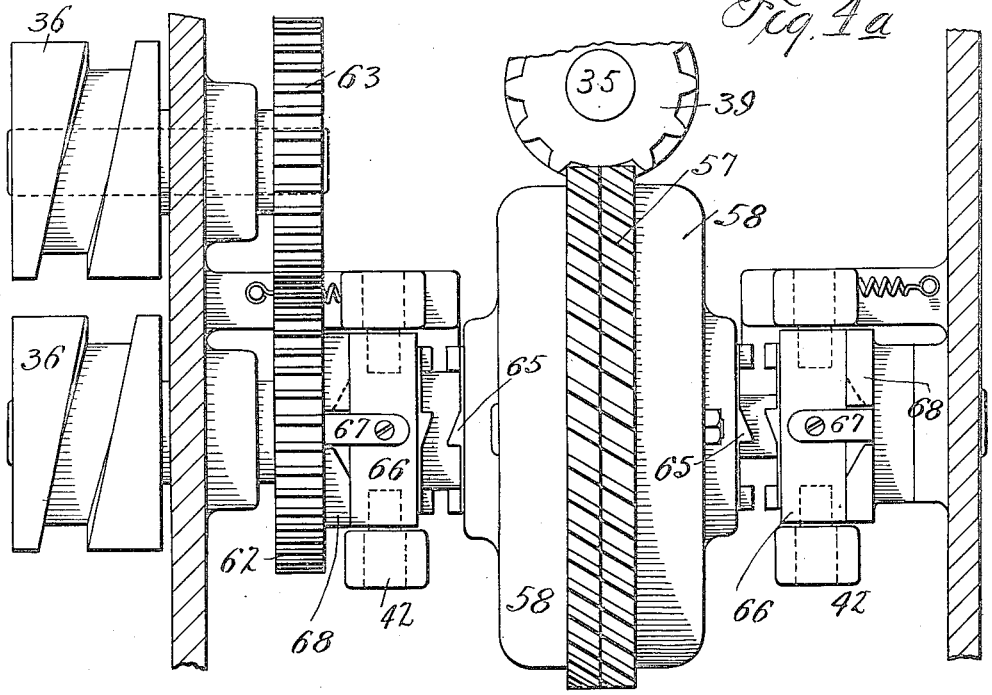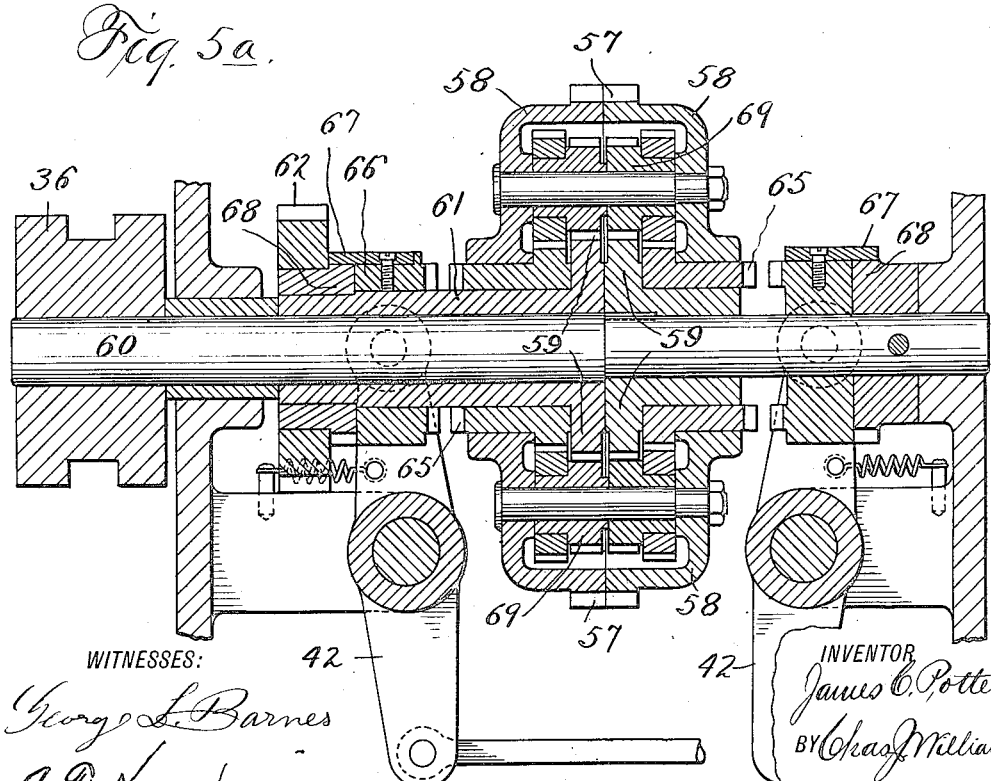

J. C. POTTER.
GEARING FOR TURRET LATHES AND OTHER MECHANISM.
APPLICATION FILED APR. 3, 1913.

1,225,487.

Patented May 8, 1917.
6 SHEETS—SHEET 5.

WITNESSES
George L. Barnes
A. P. Noyes

INVENTOR
James C. Potter,
by
Chas. J. Williamson
Attorney

J. C. POTTER.
GEARING FOR TURRET LATHES AND OTHER MECHANISM.
APPLICATION FILED APR. 3, 1913.

1,225,487.

Patented May 8, 1917.
6 SHEETS—SHEET 6.

WITNESSES
George L. Barnes
A. P. Hayes

INVENTOR
James C. Potter,
by Chas. J. Williamson,
Attorney

UNITED STATES PATENT OFFICE.

JAMES C. POTTER, OF PAWTUCKET, RHODE ISLAND.

GEARING FOR TURRET-LATHES AND OTHER MECHANISM.

1,225,487.  Specification of Letters Patent.  Patented May 8, 1917.

Application filed April 3, 1913. Serial No. 758,691.

*To all whom it may concern:*

Be it known that I, JAMES C. POTTER, of Pawtucket, in the county of Providence, and in the State of Rhode Island, have invented a certain new and useful Improvement in Gearing for Turret-Lathes and other Mechanism, and do hereby declare that the following is a full, clear, and exact description thereof.
My invention relates to the spindle speed and tool feed change mechanism of metal working machines, such as that which forms the subject of my Patent No. 1,040,751, issued October 8, 1912, and my object is to provide simplified and positively acting mechanism for automatically effecting the changes in speed and feed so that in place of a shipping mechanism for changing the spindle speed which involved the use of friction clutches, that has heretofore been proposed, I have produced one having a positive type of clutch and which is otherwise advantageous, and in place of mechanism for changing the feed, which as heretofore proposed, also involved the use of a friction clutch, I have produced one that avoids such a clutch, and is otherwise an improvement, all as will be evident from the description hereinafter given.
In the accompanying drawings, which for illustration show a machine of the type of my said patent—

Figure 1 is a vertical longitudinal section of such machine;
Fig. 2 is a similar view of a portion of the machine on a larger scale, certain parts not being completely shown in order to more clearly show other parts;

Fig. 3 a transverse section thereof with parts in elevation;

Fig. 4 a detail view, partly in horizontal section and partly in top plan view of the change speed controlling mechanism;

Fig. 4ª is a detail plan view of a different construction of mechanism from that shown in Figs. 4 and 5 for controlling the rotation of the clutch operating cams;

Figure 7:
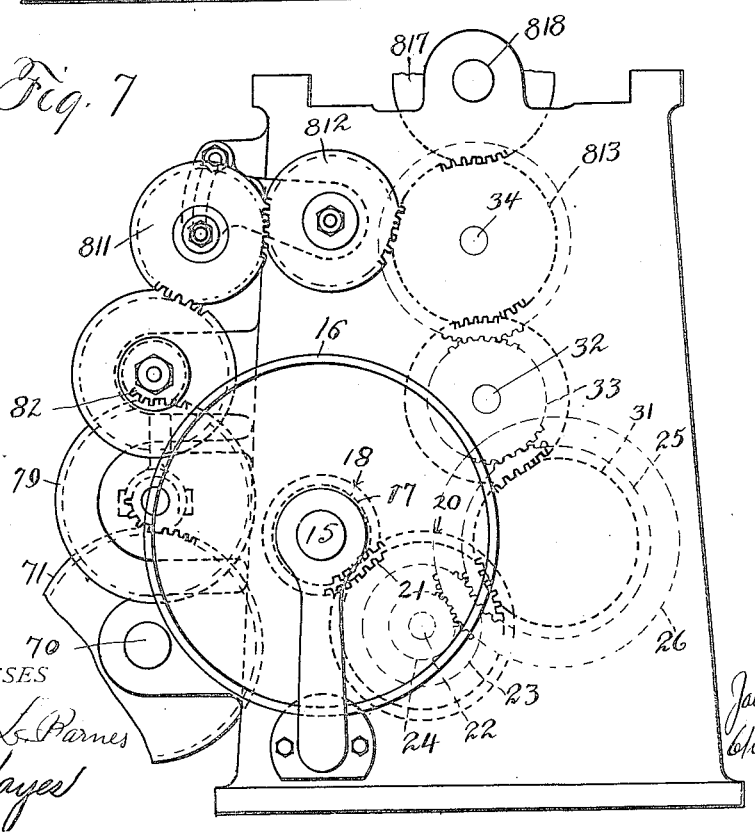
Figure 8:
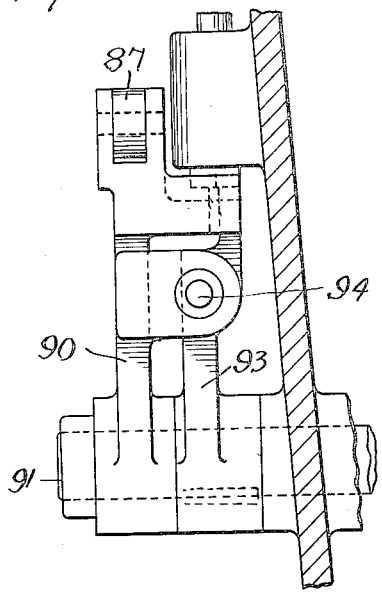
Figure 9:
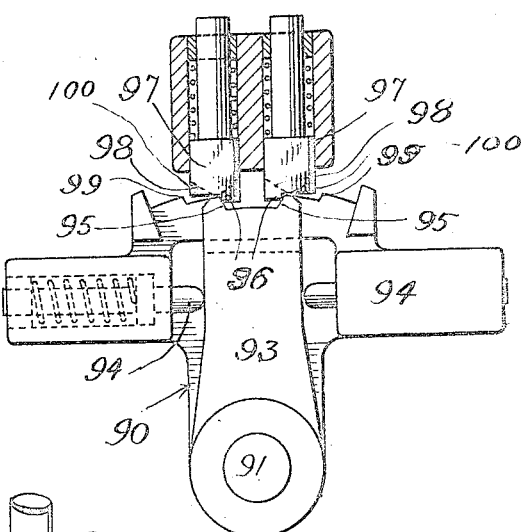
Figure 10:
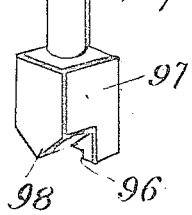
Figure 11:
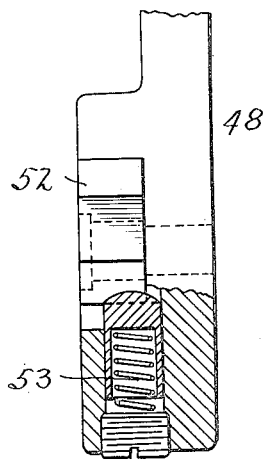
Figure 12:
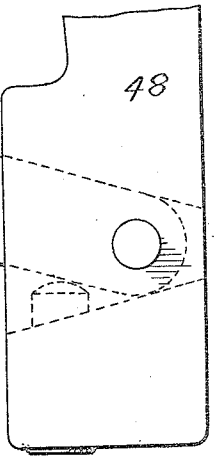

Fig. 7 an end elevation of a portion of the machine to show the gearing;

Figs. 8, 9 and 10 are detail views of parts of the feed change mechanism;

Figs. 11 and 12 are detail views of the lever end which is actuated by the dog wheel for changing the spindle speed.

The machine shown in the drawings to illustrate one embodiment of my invention, is an automatic turret lathe, having a frame 10, at one end of which is the headstock 11, supporting the spindle 12, and at the other end of which is mounted the turret slide 13 which is reciprocated to and from the work holding chuck on the spindle by a cam drum 14, of the type of that of my patent above referred to.

Power to revolve the spindle and the cam drum 14 and for the automatic operation of the speed and feed changing mechanism is taken from a main shaft 15 having a pulley 16 for a belt from a countershaft.

Describing first the spindle driving mechanism, and the means for automatically changing the spindle speed, it will be found that the main shaft has two gears 17 and 18, of different diameter, one of which, 17, is fixed to the shaft, and the other of which is loose thereon, but may be clutched thereto by a friction clutch 19. The gears 17 and 18, respectively, mesh with gears 20 and 21 also of different diameter, the gear 20 being loose on its shaft 22, but adapted automatically to be clutched thereto by a clutch of the well-known roll type and the gear 21 being keyed to said shaft 22. As the gear 21 when driven by the main shaft gear 18 drives the shaft 22 faster than the gear 20 does, the shaft will overrun the latter by reason of the roll clutch, and when the main shaft gear 18 is unclutched, the gear 21 becomes idle and the roll clutch acts and its gear 20 becomes a driver of the shaft 22. On the shaft 22 there are two gears 23 and 24 of different diameter, which, respectively, mesh with gears 25 and 26, also of different diameter and loose on a shaft 27, and adapted one at a time to be clutched thereto, the clutch of the gear 26 being a roll-type clutch, and the clutch of the gear 25 being a friction clutch 28. The friction clutch 19 is actuated by a yoke on a rock shaft 29 and the friction clutch 28 is actuated by a yoke on a rock shaft 30. From the shaft 27, by slidable change gears 31, giving two changes of speed, I drive a shaft 32, also having sliding change gears

Figure 2:
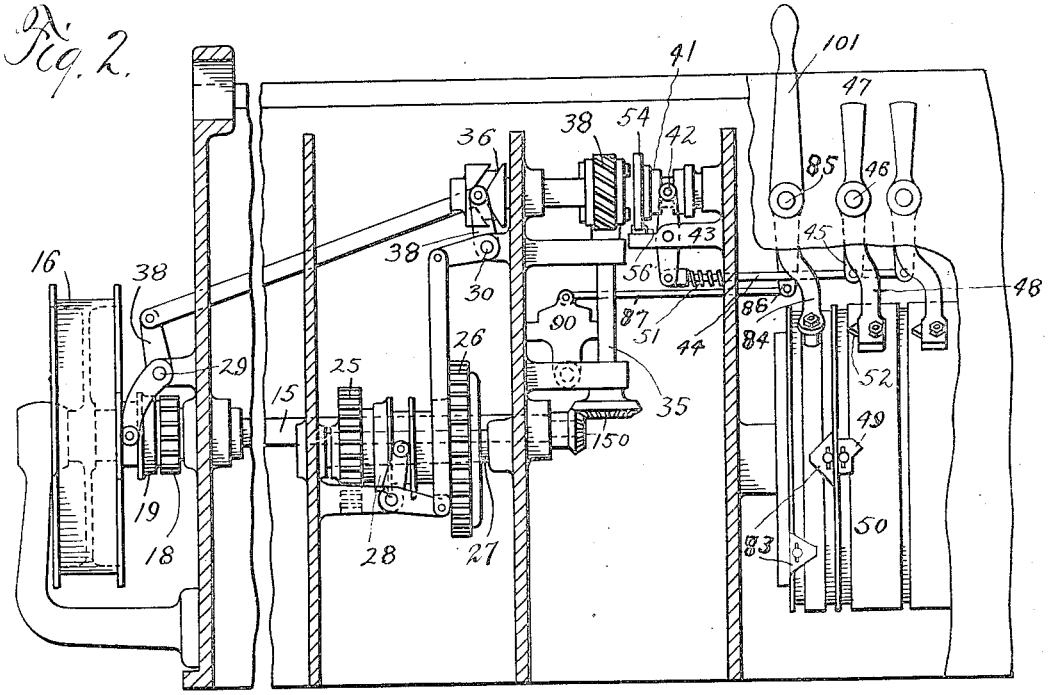
Figure 3:
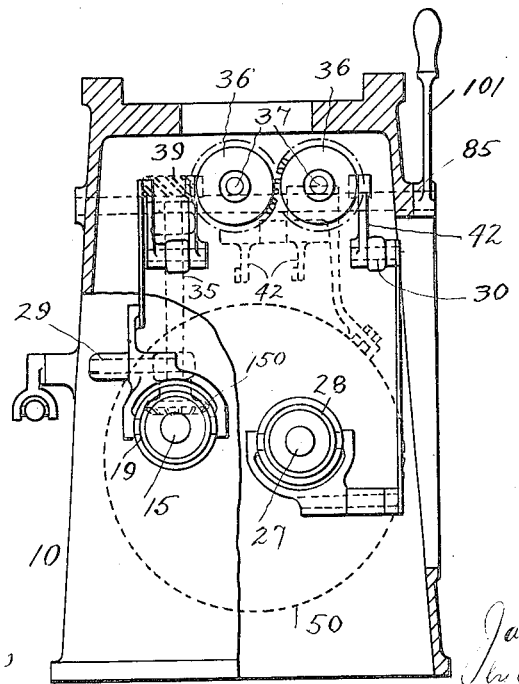

33 by which two more changes of speed are possible and from the shaft 34, of which by gearing not requiring explanation, power is transmitted to the spindle. The selection of the gear connections of the two shafts 22 and 27, which is automatically effected by the movements of the two rock shafts 29 and 30, automatically determines the spindle speed. It will be seen that by the automatically changed gear connections and the hand change gears, sixteen different spindle speeds are provided for, and that the automatic changes are accomplished by the use of but two lever operated clutches. Each rock shaft has its own operating mechanism and the operating mechanisms for the two are similar, and both receive their motion from a constantly running vertical shaft 35 journaled in bearings in the head stock end of the machine, and geared to the main shaft 15 by bevel gears 150. For each rock shaft there is a path cam 36 fixed to a shaft 37 which engages or actuates a crank arm 38 on the rock-shaft. In the form of my invention shown in Figs. 2 to 5, the two shafts 37 have, respectively, mounted on them two meshing loose gears 38, preferably spiral gears, and meshing with one of the gears 38 is a spiral gear 39 on the upper end of the vertical shaft 35, so that from the latter the two gears 38 run constantly, and when clutched to their respective shafts, they turn the latter and thereby through the cams 36 actuate the rock shafts 29 and 30 and so change the gear connections of the two shafts of the spindle driving gearing. Each of the gears 38 has clutch face pins 40 and splined to each shaft 37 is a sliding clutch collar 41 by the engagement and disengagement of which with the clutch pins of the gear, the latter is clutched to and unclutched from the shaft. Each clutch collar is engaged by one end of a lever 42 pivoted to a bracket 43 (see Fig. 2) and to the other end of the lever is pivotally connected one end of a pitman 44 whose other end is connected to a crank arm 45 on a rock shaft 46. The latter has fixed to it an operating lever having a handle 47 for hand movement, and an arm 48 whose end is in the path of a tripping dog 49 on a dog wheel 50, for the automatic movement of the rock shaft 46. A spring 51 on the pitman 44, throws both levers in opposition to the movement imparted by the dog 49. The dogs 49 are applied to the periphery of the dog wheel, and the latter has a peripheral speed that is so slow as to require provision of means for quickly moving the dog engaging part of the lever from the path of the dog, after the lever has been tripped by the dog. Such means (see Figs. 11 and 12) may take the form of a finger 52 pivoted at one end to the end of the lever, with its tip projecting therefrom in the path of the dog, and yieldingly held by a spring 53 at an inclination rearward of the path of the dog, so that when the latter strikes the finger, it will swing it forward until it is stopped by contact with the lever, whereupon the latter by the further travel of the dog will be swung on its pivot 46 until the nose of the dog passes the tip of the finger whereupon the latter will be swung by its spring to its rearwardly inclined position, and entirely clear of the slow-moving dog, even when the lever, by the action of the spring 51 is promptly returned to the position it occupied before it was moved by the dog.

In order to engage the clutch collar and the gear 38 more quickly than is possible by the action of the lever 42 when moved by the dog 52, I provide the clutch collar with an annular flange 54 which at intervals has notches 55 with sides that incline outward and rearward with reference to a lug or pin 56 which is fixed to the bracket in such position that when the lever is tripped by the dog 49, a notch 55 being in alinement with the lug 56, the clutch collar will move to engage its holes with the pins of the clutch of the gear, the notch passing over the lug, and the contact of said clutch members being sufficient to impart rotary motion from the gear to the clutch collar and bring the inclined side of the notch 56 against the lug, the effect will be to cam or crowd the clutch collar into complete engagement with the gear clutch face, and the outer side of the flange 54 being now engaged by the lug, the clutch engagement will continue until the next notch 55 alines with the lug, whereupon, under the action of the spring 51 the clutch collar will be disengaged from the wheel, for by this time the lever finger 52 will have been cleared from the path of the tripping dog 49. When the clutch is automatically thrown by the spring, the lug 56 remains in the notch 55 with which it alines and thus locks the clutch collar and cam 36 from rotation.

Figure 4:
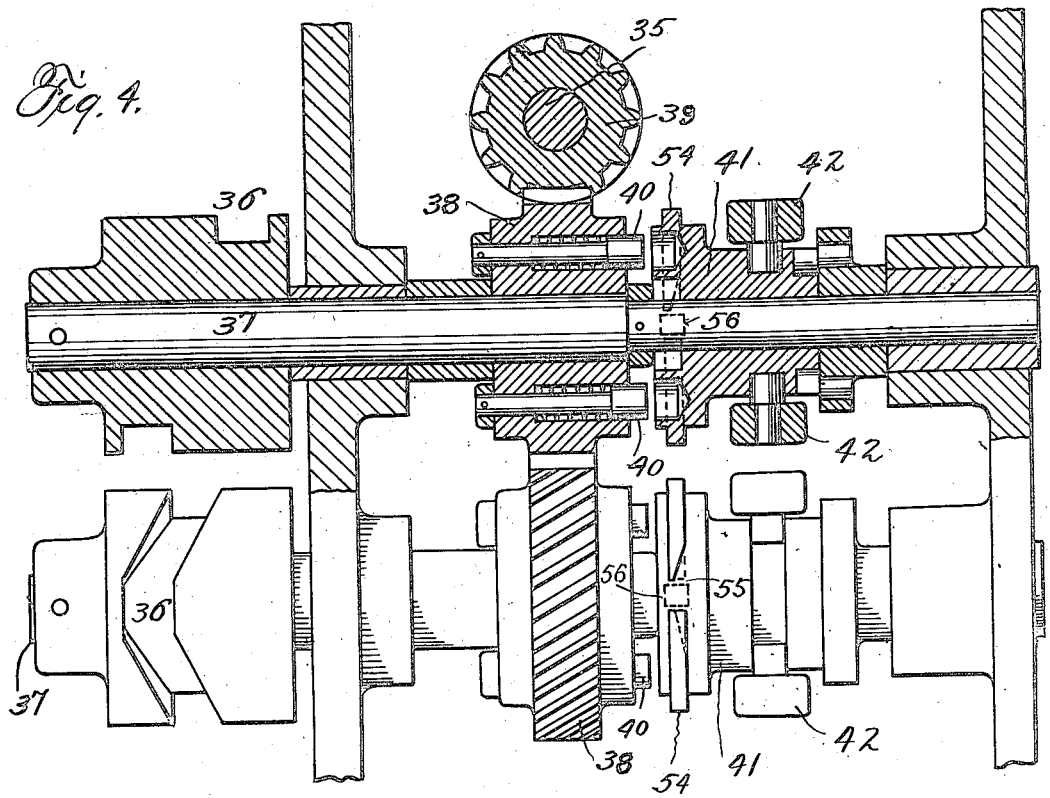
Figure 5:
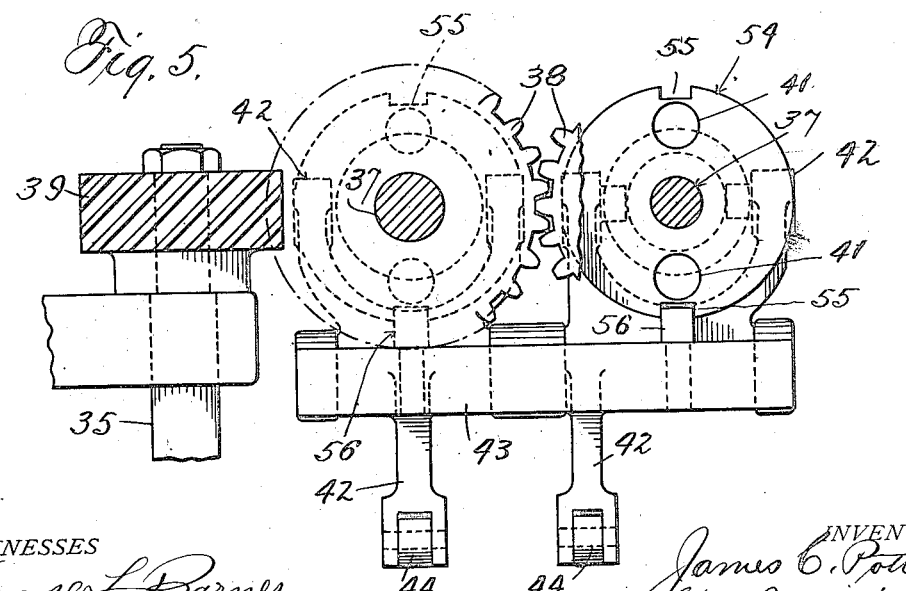
Fig. 5 is an end elevation thereof with parts broken away;
Fig. 5ª is a vertical section of the construction shown in Fig. 4ª.

Instead of the construction I have described for connecting the cam shafts 37 to the vertical shaft to take power from the latter, that shown in Figs. 4$^a$ and 5$^a$, may be used. In this case the vertical shaft gear 39 meshes with a spiral gear 57 on the periphery of a shell or box 58 which incloses two differential gears 59, one of the sun gears of one of which is keyed to a shaft 60 which carries one of the cams 36 and one of the sun gears of the other of which is keyed to a tubular shaft 61 concentric with the shaft 60, and which has a gear 62 that meshes with a gear 63 on a shaft 64 that carries the other cam 36. The other loose sun gear of each differential gear has a clutch face 65 adapted for engagement by a clutch collar 66 actuated by a dog-tripped lever just as in the other form of my invention, and a notched flange and lug device similar to the one above described is provided to cause the quick engagement of the clutch collar and the loose sun gear and to fix the period of such engagement with the difference that the lug 67 is carried by the clutch collar and the notched flange 68 is carried by the shaft, and the clutch collar 66 is non-rotary so as to prevent the engaged sun gear from turning and thereby cause the revolution of the shafts through the action of the planet pinions 69 on the sun gears which are fixed to the two shafts.

It will be seen that my speed-changing mechanism is certain and positive in its action, and, considering the work it has to do is free from complication of parts and undesirable motions.

The cam drum 14 receives its motion through gearing not necessary to be described from a feed shaft 70, conveniently placed at the back of the machine, to which the feeding motion is imparted by differential gearing 71, as usual, and which, as usual is revolved at a constant high speed, for the return revolution of the turret and the advance to cutting position, and which is geared to the spindle when work is being done in order to secure the proper speed and feed relations, but is revolved independently of the spindle for the non-feeding motion of the turret slide, all as in my previously patented machines of this type.

Figure 1:
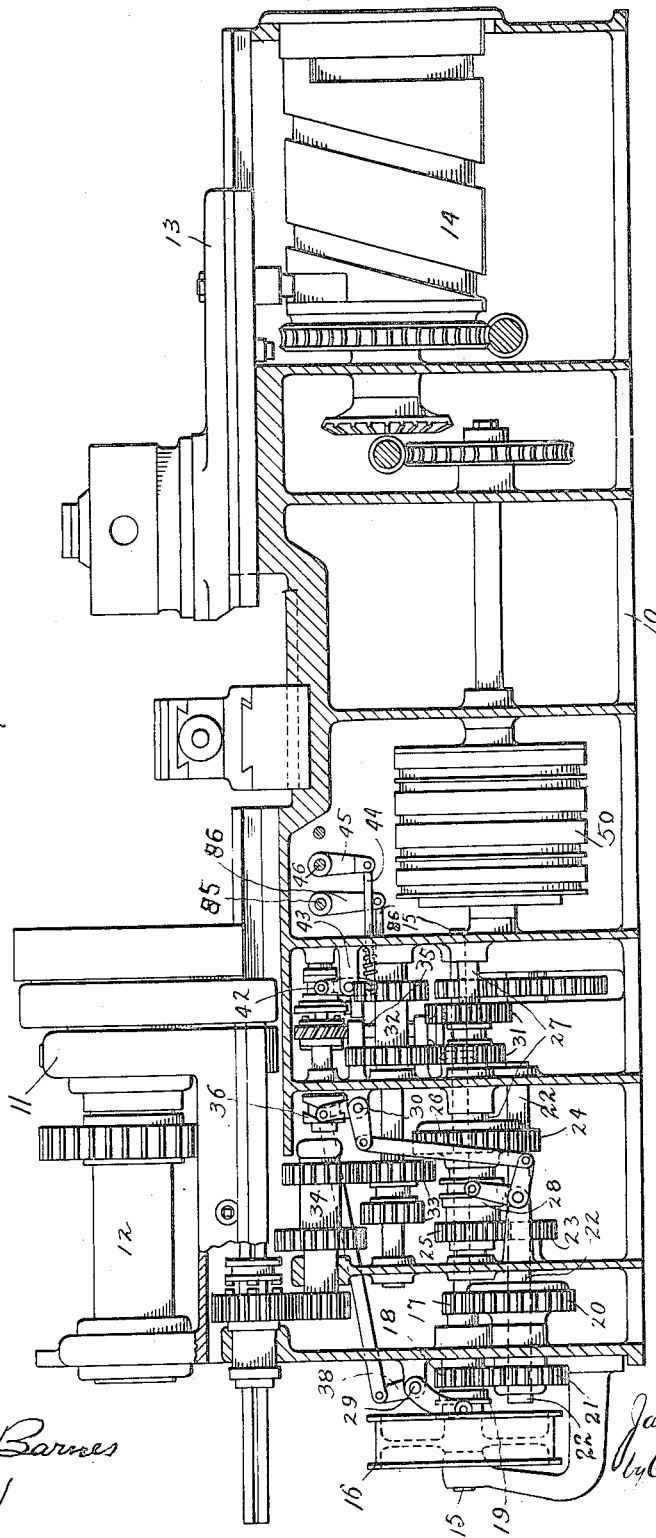
Figure 6:
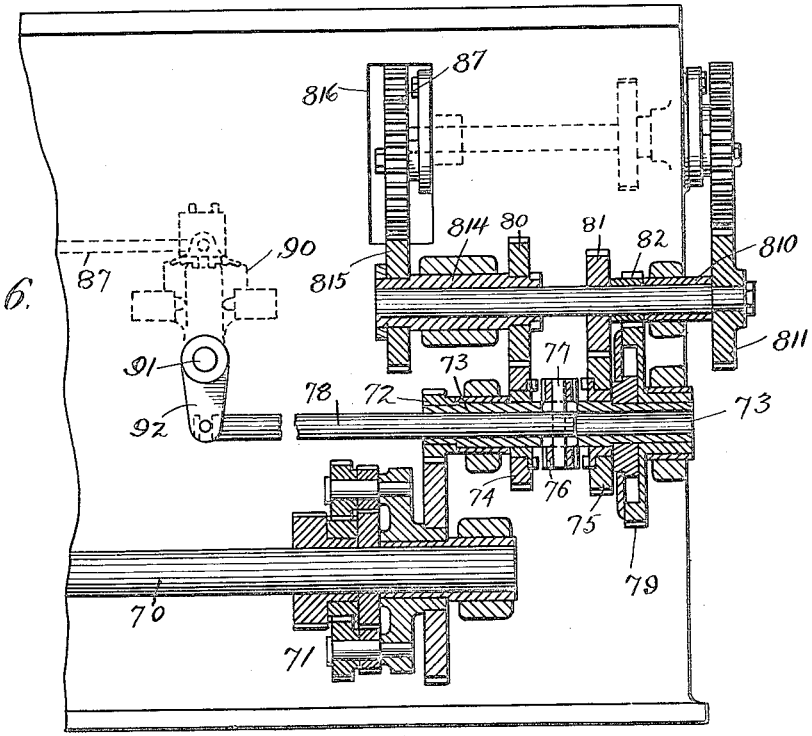
Fig. 6 is a longitudinal section showing the feed changing mechanism.

Geared to the pinion carrier of the differential gear by a train that includes a pinion 72, is a shaft 73. On the latter are two loose gears 74 and 75 of different diameter, each having a clutch face adapted alternately to be engaged by a sliding clutch collar 76 rotatively connected to the shaft 73 by a diametrically extending pin 77 which also connects the clutch to a slidable rod 78 situated in the shaft 73, which is tubular for that purpose. Also mounted on the shaft 73 is a third and larger gear 79 adapted to be automatically clutched thereto by a roll type clutch (such as I have before described) when neither of the other two gears is clutched to the shaft, and all three of said gears mesh, respectively, with three gears 80, 81 and 82 of varying diameter which are geared to and receive motion from the main shaft. When either of the gears 74 and 75 is clutched to the shaft 73, the roll clutch permits the shaft to overrun the largest gear 79. Referring to Figs. 6 and 7 it will be seen that the gears 81 and 82 are on a shaft 810 to which is fixed a gear 811 which through an intermediate gear 812 meshes with a gear 813 on the shaft 34, which receives motion through the train of gears, before described, from the main shaft 15. The gear 80 is on a sleeve 814 to which is fixed a gear 815, which through intermediate gear 816 meshes with a gear 817 on a shaft 818 (see Fig. 1) that has a gear 819 in mesh with a gear 820 on the shaft 34. On the shaft 818 is a pinion not shown in Fig. 1, which meshes with a gear 820 on the spindle 12.

The change of feed is effected from the dog wheel, which has adjustable dogs 83 for the purpose which rock a lever 84 on a rock shaft 85 having a crank arm 86 which is connected by a rod 87 with a crank arm 90, loose on a rock shaft 91 that has a crank 92 that is connected to the clutch shifting rod 78. The dog wheels are arranged at opposite sides of the lever so that it is alternately rocked in opposite directions. Keyed to the rock shaft 91 is a crank arm 93 which lies between, and is engaged by the ends of two spring pressed pins 94 carried by the crank arm 90. At the outer end of the crank arm 93 there are opposite shoulders 95 formed by a notch each of which is engaged by a locking shoulder 96 on the lower end of a spring pressed pin or dog 97, which dogs 97 hold the crank arm 93 from movement in either direction. On the lower end of each dog is a beveled nose 98, which by the rocking of the crank arm 90 is engaged by a shoulder 99 and the dog 97 thereby lifted and the arm 93 released so that it will be thrown by the pressure of the spring pressed pin 94 produced by the movement of the arm 90. Thus a quick shifting of the clutch rod 78 is effected that could not be obtained by the slow-acting dog wheel. When the arm 93 is thrown over by the spring pressed pin 94, it is locked in that position by the shoulder 95 being engaged by the side 100 of the dog 97. On the reverse motion the shoulder 99 lifts the dog to take the dog shoulder 100 from the arm shoulder 95, and then the arm 93 swings to neutral position where it is locked by the engagement of the dog shoulder 96 with the arm shoulder 95, which is the position of the parts shown in Fig. 9. A handle 101 on the rock shaft 85 enables the change of feed to be done by hand.

It will be perceived that my feed changing mechanism, although providing for three automatic changes of feed, is, nevertheless simple in construction, positive in action and reliable; and that both speed changing and feed changing mechanisms are controlled by the simple device of adjustable dogs and that one dog wheel serves for all.

It is to be understood that my invention may be embodied in machines differently constructed as to details and organization, and, hence, the scope of my claims is to be determined accordingly.

Having thus described my invention what I claim is—

1. In a gear changing mechanism for lathes, the combination of a driving shaft, a spindle, a plurality of gear trains between the shaft and the spindle, and means for changing from one gear train to another, comprising a constantly revolving shaft, a clutch operating shaft, a positive gear connection between the constantly revolving shaft and the clutch operating shaft, and automatic means to render said positive gear connection operative or inoperative at predetermined times.

2. In a gear changing mechanism for lathes, the combination of a driving shaft, a spindle, a plurality of gear trains between the shaft and the spindle, and means for changing from one gear train to another, comprising a constantly revolving shaft, a clutch operating shaft, a positive gear connection between the constantly revolving shaft and the clutch operating shaft, a clutch for said positive gear connection having a slotted flange and a stationary flange-engaging lug, that fixes the duration of the clutching engagement.

3. In a gear changing mechanism for lathes, the combination of a driving shaft, a spindle, a plurality of gear trains between the shaft and the spindle, and means for changing from one gear train to another, comprising a constantly revolving shaft, a pair of clutch operating shafts, a positive gear connection between the constantly revolving shaft and the two clutch operating shafts, and automatic means to render said positive gear connection operative or inoperative at predetermined times.

4. In a gear changing mechanism for lathes, the combination of a driving shaft, a spindle, a plurality of gear trains between the shaft and the spindle, and means for changing from one gear train to another, comprising a constantly revolving shaft, a clutch operating shaft, a positive gear connection between the constantly revolving shaft and the clutch operating shaft, including a clutch member slidably mounted on said clutch-operating shaft, automatic means for moving said clutch member in each direction, and automatic means that fix the duration of the clutch engagement of said clutch member.

5. In a gear changing mechanism for lathes, the combination of a driving shaft, a spindle, a plurality of gear trains between the shaft and the spindle, and means for changing from one gear train to another, comprising a constantly revolving shaft, a clutch operating shaft, a positive gear connection between the constantly revolving shaft and the clutch operating shaft, including a clutch member slidably mounted on said clutch-operating shaft, automatic means for moving said clutch member in each direction, and automatic means that fix the duration of the clutch engagement of said clutch member, comprising a notched flange and a lug coöperating with the flange.

6. The combination of a spindle, a driving shaft, and gearing between the driving shaft and the spindle comprising a plurality of sets of automatic speed changing gears, and a plurality of hand shiftable slidable speed changing gears.

7. In a turret lathe, the combination of a driving shaft, a feed shaft, a plurality of gear connections between the driving shaft and the feed shaft for driving the latter at different speeds, and automatic means to change the gear connection between said two shafts comprising two movable arms, a latch mechanism for one of said arms, a spring-pressed device carried by the other arm and adapted to engage the arm having the latch mechanism, a dog wheel, and means actuated by the dog wheel for moving the arm which carries the spring device.

8. In a turret lathe, the combination of a driving shaft, a feed shaft, a plurality of gear connections between the driving shaft and the feed shaft for driving the latter at different speeds, and automatic means to change the gear connection between said two shafts comprising two movable arms, a latch mechanism for one of said arms, a spring-pressed device carried by the other arm and adapted to engage the arm having the latch mechanism, a dog wheel, and means actuated by the dog wheel for moving the arm which carries the spring device, and means carried by said last named arm to release said latch mechanism.

9. As an improvement in gearing for mechanisms having a rotating member and a slidable member that have a coöperative relation, the combination of a rotating member, a sliding member, a support for the sliding member on which it is shiftable toward and from the rotating member, a driving member, a connection from said driving member to the rotating member, and an independent connection from said driving member to the sliding member to impart movements thereto in its travel toward the rotating member.

10. As an improvement in gearing for mechanisms having a rotating member and a slidable member that have a coöperative relation, the combination of a rotating member, a sliding member, a support for the sliding member on which it is slidable toward and from the rotating member, a driving member, a connection from said driving member to the rotating member, a branch connection leading from said driving member to the sliding member, that is independent of the connection between the driving member and the rotating member and means for changing both the speed of the rotating member and the speed of the sliding member in its travel toward the rotating member.

11. As an improvement in gearing for mechanisms having a rotating member, and a slidable member that have a coöperative relation, the combination of a rotating member, a sliding member, a support for the sliding member on which it is slidable toward and from the rotating member, a shaft, an operative connection between said shaft and the sliding member for reciprocating the sliding member, a driving member, a connection from the driving member to the rotating member, independent trains of gearing between the driving member and said shaft for varying the speed of rotation of said shaft, said trains being independent of the rotating member, and means for causing the rotation of said shaft at different times from one train of gearing or another.

12. As an improvement in gearing for mechanisms having a rotating member, and a slidable member that have a coöperative relation, the combination of a rotating member, a sliding member, a support for the sliding member on which it is slidable toward and from the rotating member, a shaft, an operative connection between said shaft and the sliding member for reciprocating the sliding member, a driving member, a connection from the driving member to the rotating member, independent trains of gearing between the driving member and said shaft for varying the speed of rotation of said shaft in the same direction, which direction causes the movement of the sliding member toward the rotating member, and automatically acting means for causing the rotation of said shaft at different times from one train of gearing or another.

13. As an improvement in gearing for mechanisms having a rotating member, and a slidable member that have a coöperative relation, the combination of a rotating member, a sliding member, a support for the sliding member on which it is slidable toward and from the rotating member, a shaft, an operative connection between said shaft and the sliding member for reciprocating the sliding member, a driving member, a connection from the driving member to the rotating member, independent trains of gearing between the driving member and said shaft for varying the speed of rotation of said shaft in the same direction, which direction causes the movement of the sliding member toward the rotating member, automatically acting means for causing the rotation of said shaft at different times from one train of gearing or another, comprising a rotatable cam-carrying drum, and a driving connection between said drum and said driving member.

14. As an improvement in gearing for mechanisms having a rotating member, and a slidable member that have a coöperative relation, the combination of a rotating member, a sliding member, a support for the sliding member on which it is slidable toward and from the rotating member, a cam drum acting upon said sliding member to reciprocate the same, a connection from said driving member to said rotating member and to said cam drum for rotating said cam drum to cause the movement of said sliding member toward the rotating member, and means for automatically changing the speed of said cam drum independent of the speed of said rotating member.

15. As an improvement in gearing for mechanisms having a rotating member, and a slidable member that have a coöperative relation, the combination of a rotating member, a sliding member, a support for the sliding member on which it is slidable toward and from the rotating member, a cam drum acting upon said sliding member to reciprocate the same, a connection from said driving member to said rotating member, a shaft extending parallel with the axis of the rotating member and the axis of the cam drum, independent trains of gearing between said driving member and said shaft for rotating the latter at different speeds, an operative connection between said shaft and said cam drum whereby the speed of the drum changes with the speed of rotation of said shaft, and automatic means for causing the rotating of said shaft at different times from one train of gearing or another.

16. As an improvement in gearing for mechanisms having a rotating member, and a slidable member that have a coöperative relation, the combination of a rotating member, a sliding member, a support for the sliding member on which it is slidable toward and from the rotating member, a shaft geared to and receiving motion from the driving member, a gear connection from said shaft to said rotating member for revolving the latter, a rotating cam device that imparts sliding movements to said sliding member, a distinct variable speed gear connection between said shaft and said rotating cam device, and automatic means comprising a rotating cam device for varying the speed through said variable speed gearing.

In testimony that I claim the foregoing I have hereunto set my hand.

JAMES C. POTTER.

Witnesses:
EARL H. ROBERTS,
ELVERY LINGARD.